United States Patent [19]
Kim et al.

[11] Patent Number: 6,072,834
[45] Date of Patent: Jun. 6, 2000

[54] SCALABLE ENCODING APPARATUS AND METHOD WITH IMPROVED FUNCTION OF ENERGY COMPENSATION/INVERSE COMPENSATION

[75] Inventors: Jong Nam Kim; Tae Hwan Shin; Tae Sun Choi, all of Kwangju; Il Yoon, Kyongki-do, all of Rep. of Korea

[73] Assignee: Samsung Electro-Mechanics Co., Ltd., Kyongki-Do, Rep. of Korea

[21] Appl. No.: 08/999,072

[22] Filed: Dec. 29, 1997

[30] Foreign Application Priority Data

Jul. 11, 1997 [KR] Rep. of Korea ....................... 97/32254

[51] Int. Cl.[7] ....................................................... H04N 7/12
[52] U.S. Cl. ............................ 375/240; 382/56; 364/514; 358/133; 358/135; 358/140; 358/141; 358/433; 358/261.2
[58] Field of Search ..................................... 348/384, 390, 348/400, 401, 402, 403, 404, 409, 415, 416, 395–397, 398, 420, 421, 396

[56] References Cited

U.S. PATENT DOCUMENTS

| | | | |
|---|---|---|---|
| 5,001,559 | 3/1991 | Gonzales et al. | 358/133 |
| 5,253,075 | 10/1993 | Sugiyama | 358/433 |
| 5,331,414 | 7/1994 | Golin | 348/390 |
| 5,371,544 | 12/1994 | Jacquin et al. | 348/398 |
| 5,414,469 | 5/1995 | Gonzales et al. | 348/408 |
| 5,446,495 | 8/1995 | Tourtier et al. | 348/398 |
| 5,526,131 | 6/1996 | Strolle et al. | 358/335 |
| 5,608,652 | 3/1997 | Astle | 364/514 |
| 5,742,343 | 4/1998 | Haskell et al. | 348/415 |

FOREIGN PATENT DOCUMENTS 0 771 119 A2  2/1997  European Pat. Off. .

*Primary Examiner*—Andy Rao
*Assistant Examiner*—Shawn An
*Attorney, Agent, or Firm*—Renner, Otto, Boisselle & Sklar, LLP

[57] ABSTRACT

A scalable encoding method accurately performs the decimation of a low-resolution frame from a high-resolution frame by compensating for the energy of the low-resolution image in consideration of the rate of the total energy of high-resolution to the partial energy of a corresponding block to be decimated, alleviating the drift effect and enabling good video recovery.

16 Claims, 11 Drawing Sheets

SCALABLE ENCODING APPARATUS AND METHOD WITH IMPROVED FUNCTION OF ENERGY COMPENSATION/INVERSE COMPENSATION

FIELD OF THE INVENTION

The present invention relates to a scalable encoder and its encoding method for encoding both of high-resolution image and low-resolution image in a transmitter with video compression function. More particularly, this invention deals with a scalable encoder and its encoding method with improved energy compensation/inverse compensation, which eliminates the drift effect that reduces the quality of picture on the screen, by precisely performing the decimation of the low-resolution image from the high-resolution image.

BACKGROUND OF THE INVENTION

Generally speaking, the amount of video data is extremely huge, compared with voice or characters data, so that the real-time processing in storage or transmission becomes impossible without coding.

The coding of video data in a certain method enables them to be processed in real time during storage or transmission. For the international standards for video coding, there are currently suggested JPEG for still image, MPEG1 and MPEG2 for moving image, and MPEG4 under development for low-speed bit-rate transmission.

In video data, the amount of information practically contained and the amount of information actually used to express it are not equal, which is called redundancy of data.

Spatial redundancy is caused by the similarity of value between pixels. It is noted that when a predetermined pixel is selected, its value and other adjacent pixels' values are similar. For the processing of spatial redundancy, discrete cosine transform (DCT) is used.

Secondly, probabilistic redundancy results from the redundancy of symbols that express data. The distribution of data is not regular probabilistically, and there are frequently occurring symbols as usual. For this redundancy, entropy coding is utilized, which belongs to variable length coding.

Temporal redundancy is produced from the similarity between previous and present frame images. This is processed with motion estimation/motion compensation.

Meanwhile, with the rapid development of information/communications industry, many services, such as video on demand, tele-teaching, videoconferencing, high-definition TV, tele-diagnosis, teleshopping, are now under way or in course of preparation. If compressed video signals of these various services are to be provided using respective receivers, as many receivers as the number of services are required. In order to overcome such a drawback, scalable coding has been suggested in which the services' signals are compressed in a single mode and decoded in accordance with the respective receivers. With this scalable coding, such many services can be offered through only a receiver. The scalable coding has roughly two kinds of sub-band coding and pyramid coding, which are different in dividing an original image into smaller pieces.

FIG. 1 is a diagram of the whole configuration of a conventional scalable encoder. This encoder codes video signals input by frames into high-resolution image and low-resolution image. Intraframe coding is performed in the high-resolution frame, and then interframe coding is carried out. From now on, intraframe coding and interframe coding are explained respectively.

First, the configuration of intraframe coding includes an 8*8 block divider 11 for dividing a video signal Sin input by frames into 8*8 blocks, an 8*8 block discrete cosine transformer 12 for converting the plane domain of the video signal divided into 8*8 blocks into frequency domains through DCT transform, an 8*8 block quantizer 13 for quantizing the difference signal (a video signal without overlapped image) between the video signal (8*8 block frame) converted into frequency domains and the video signal (4*4 block frame) of block inverse compensator 33, an 8*8 block variable length coding portion 14 for encoding the quantized video signal, and then outputting the encoded signal S14 to a multiplexer 60, a 4*4 block decimator 21 for decimating 4*4 blocks of video signal from 8*8 blocks of video signal output from 8*8 block DCT 12, an energy coefficient compensator 22 for multiplying the video signal extracted into 4*4 blocks by 0.25(¼) in order to perform energy compensation, a 4*4 block quantizer 23 for quantizing the energy-compensated video signal, a 4*4 block variable length coding portion 24 for encoding the quantized video signal, and then outputting the encoded signal S24 to multiplexer 60, a 4*4 block inverse quantizer 31 for inversely quantizing the video signal from 4*4 block quantizer 23, an 8*8 block interpolator 32 for interpolating the inversely quantized 4*4 block video signal into 8*8 blocks of video signal, using zero, an block inverse compensator 33 for inversely compensating for the energy of the interpolated video signal, an 8*8 block inverse quantizer 41 for inversely quantizing the video signal from 8*8 block quantizer 13, an 8*8 block inverse DCT 42 for performing the inverse DCT to the sum signal (an approximate signal of the video signal of 8*8 block DCT 12) between the video signal of 8*8 block inverse quantizer 41 and the video signal of block inverse compensator 33, an adder 43 for summing the video signal of 8*8 block inverse DCT 42 and the video signal (zero) of motion compensator 53, and a frame memory 44 for storing the frame signal passing through adder 43 for the purpose of interframe coding. Because the video signal of motion compensator 53 is concerned only during interframe coding, it becomes zero during intraframe coding, and during interframe coding, is a video signal of 8*8 blocks having a predetermined value.

The configuration of interframe coding in the conventional encoder is added to the aforementioned construction of intraframe coding. The interframe coding configuration includes a 16*16 block divider 51 for dividing a video signal into 16*16 blocks, a motion vector estimation portion 52 for detecting a motion vector MV from the video signal (present frame) divided into 16*16 blocks and the video signal (previous frame) of frame memory 44, and a motion compensator 53 for producing a new frame, using the motion vector MV of motion vector estimation portion 52 and the frame of frame memory 44. Additionally, there is a multiplexer 60 for selectively outputting video signal (8*8 block video signal) S14 of 8*8 block variable length coding portion 14, video signal S24 (4*4 block video signal) of 4*4 block variable length coding portion 24, and motion vector MV of motion vector estimation portion 52 in a predetermined order.

FIG. 2a is a diagram of the configuration of a conventional high-resolution decoder, FIG. 2b being of a conventional low-resolution decoder. With FIGS. 2a and 2b, there will be explained the configurations of the decoders that decode the signals encoded in the aforementioned encoder.

First of all, referring to FIG. 2a, the high-resolution decoder (related to 8*8 block image) includes a demultiplexer 111 for separately outputting input compressed video signal Sin into signals S14 and S24 of 8*8 blocks and 4*4 blocks, and into motion vector MV, an 8*8 block inverse quantizer 112 for inversely quantizing 8*8 blocks of video signal S14, a 4*4 block inverse quantizer 113 for inversely quantizing 4*4 blocks of video signal S24, an 8*8 block interpolator 114 for interpolating the 4*4 block video signal inversely quantized in 4*4 block inverse quantizer 113 into 8*8 blocks of video signal, an 8*8 block inverse DCT 115 for converting the frequency domain of the sum signal between the video signal of 8*8 block inverse quantizer 112 and the video signal of 8*8 block interpolator 114 into plane domain through inverse DCT, an adder 116 for summing the video signal converted into plane domain and the video signal of motion compensator 118, and then outputting a video signal Sout of the decoder, a frame memory 117 for storing the signal passing through adder 116 for the purpose of interframe coded data recovery, and a motion compensator 118 for compensating for the video signal stored in frame memory 117 according to the motion vector of demultiplexer 111, and then offering the compensated result to adder 116.

Turning to FIG. 2b, the low-resolution decoder includes a demultiplexer 121 for separately outputting input compressed video signal Sin into video signal S24 of 4*4 blocks and motion vector MV, a 4*4 block inverse quantizer 122 for inversely quantizing 4*4 blocks of video signal S24, a 4*4 block inverse DCT 123 for converting the frequency domain of the video signal of 4*4 block inverse quantizer 122 into plane domain through inverse DCT, a motion vector scaling portion 124 for scaling motion vector MV of demultiplexer 121, an adder 127 for summing the video signal 4*4 block inverse DCT 123 and the video signal of motion compensator 126, and then outputting a video signal Sout of the decoder, a frame memory 125 for storing the signal passing through adder 127, and a motion compensator 126 for compensating for the video signal stored in frame memory 125 according to the output signal of motion vector scaling portion 124, and then offering the compensated result to adder 127.

The conventional scalable encoder adopts pyramid coding. However, when the top left 4*4 blocks are decimated from the 8*8 block frame, the 8*8 blocks' energy is not suitable for 4*4 blocks extracted so that it needs to be compensated for.

Until now, the configuration of the conventional scalable encoder was explained in addition to the conventional decoder for reference. The scalable encoder has the following drawbacks.

In the conventional scalable encoder, energy compensation is performed by multiplying the energy value of a pixel decimated from the 8*8 block frame by a weight 0.25 (¼). Without consideration of optimal energy for the 4*4 block frame related to the energy distribution of the 8*8 block frame, the constant weight W 0.25 is always applied. However, the energy value in a frame does not depend only on the size of frame so that inappropriately decimated image may be obtained due to the imprecise energy compensation during repeated interframe coding. An image produced with the motion vector becomes inaccurate. With that problem, as interframe coding advances, errors are accumulated, causing drift effect where an image becomes wavelike to decrease the quality of picture.

SUMMARY OF THE INVENTION

Therefore, in order to overcome such drawbacks of the prior art, an objective of the present invention is to provide a scalable encoding apparatus and method with an improved energy compensation/inverse compensation, which accurately performs frame decimation and interpolation by performing energy compensation and energy inverse compensation on basis of the energy distribution of frame when a low-resolution frame is decimated/interpolated from a high-resolution frame.

To accomplish the objective of the present invention, there is provided scalable encoder for compensating for the energy of a low-resolution image decimated from a high-resolution image by frames, and inversely compensating for the energy of a video signal that is interpolated to the high-resolution image from the low-resolution image, the encoder comprising: an 8*8 block DCT for dividing a video signal input by frames into 8*8 blocks, and performing DCT to the video signal divided; an 8*8 block quantizer for quantizing a difference signal between the DCT-transformed video signal and the interpolated video signal; a 4*4 block decimator for decimating 4*4 blocks of video signal from the video signal DCT transformed; a 4*4 block quantizer for quantizing the video signal decimated; an 8*8 block interpolator for interpolating the energy-compensated video signal into 8*8 blocks; an energy compensator for obtaining an energy compensation value on basis of the energy of the video signal from the 8*8 block DCT, and compensating for the energy of the 4*4 block video signal from the 4*4 block decimator according to the energy compensation value; and an energy inverse compensator for inversely compensating for the energy of the image from the 8*8 block interpolator according to the energy compensation value from the energy compensator.

BRIEF DESCRIPTION OF THE ATTACHED DRAWINGS

These and other features of the invention will be understood more clearly from the following description, read in conjunction with the drawings, in which.

DETAILED DESCRIPTION OF THE INVENTION

Figure 1:
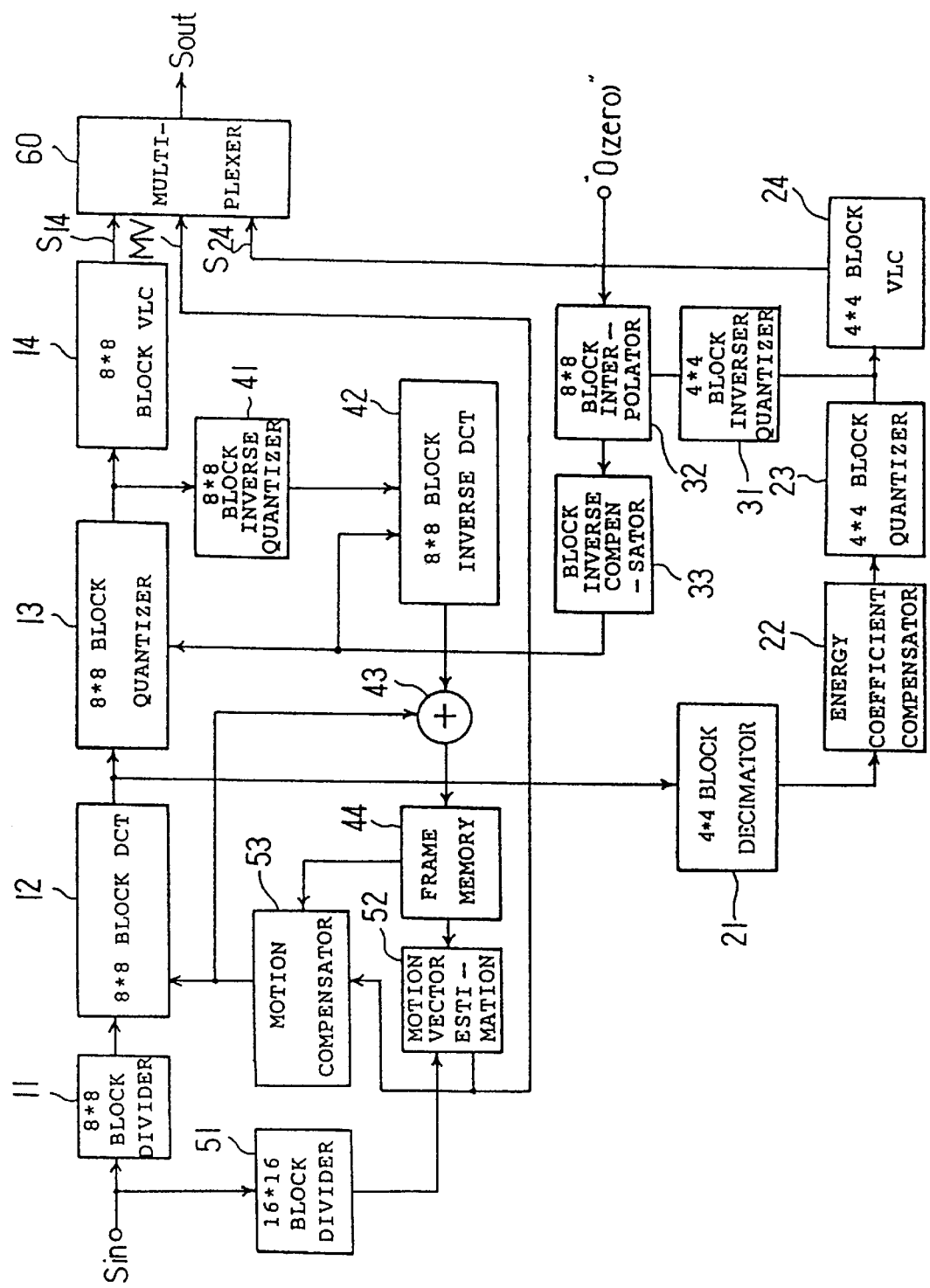
FIG. 1 is a block diagram of the whole configuration of a conventional scalable encoder.

Hereinafter, a preferred embodiment of a scalable encoder of the present invention will be described in detail with reference to the attached drawings. In those drawings, components having substantially the same construction and function are indicated with the same reference numerals.

Roughly stating the whole configuration of the scalable encoder of the present invention, this encoder has an improved energy compensator and energy inverse compensator in order to alleviate the drift effect, in addition to the configuration of the conventional scalable encoder.

Figure 4:
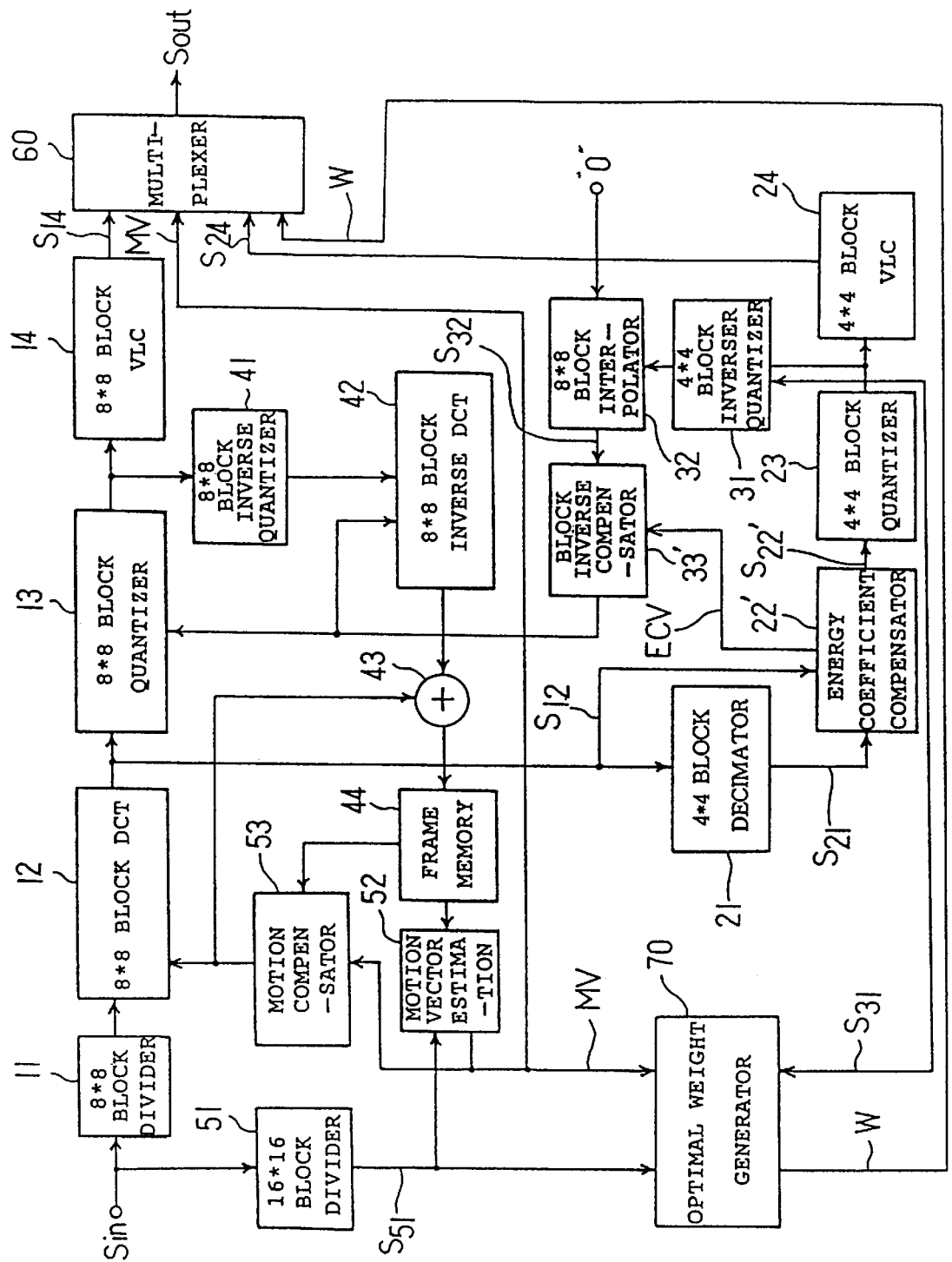
FIG. 4 is a block diagram of a scalable encoder of the present invention.

Referring to FIG. 4, the configuration of intraframe coding of the present invention includes an 8*8 block divider 11 for dividing a video signal Sin input by frames into 8*8 blocks, an 8*8 block DCT 12 for DCT transforming the video signal divided into 8*8 blocks, an 8*8 block quantizer 13 for quantizing the difference signal (a video signal without overlapped image) between the DCT transformed video signal (8*8 block frame) and the video signal (4*4 block frame) of block inverse compensator 33', an 8*8 block variable length coding portion 14 for encoding the quantized video signal, and then outputting the encoded signal S14 to a multiplexer 60, and a 4*4 block decimator 21 for decimating top left 4*4 blocks of video signal from 8*8 blocks of video signal output from 8*8 block DCT 12.

In addition to those components, there are further included an energy coefficient compensator 22 for obtaining energy compensation value ECV on basis of the energy of the video signal of 8*8 block DCT 12, and compensating for the energy of the 4*4 block video signal from 4*4 block decimator 21 according to the energy compensation value ECV, a 4*4 block quantizer 23 for quantizing the energy-compensated video signal, a 4*4 block variable length coding portion 24 for encoding the quantized video signal, and then outputting the encoded signal S24 to multiplexer 60, a 4*4 block inverse quantizer 31 for inversely quantizing the video signal from 4*4 block quantizer 23, an 8*8 block interpolator 32 for interpolating the inversely quantized 4*4 block video signal into 8*8 blocks of video signal, using zero, and a block inverse compensator 33' for inversely compensating for the energy of the video signal from 8*8 block interpolator 32 according to energy compensation value ECV of energy coefficient compensator 22'.

Furthermore, there are included an 8*8 block inverse quantizer 41 for inversely quantizing the video signal from 8*8 block quantizer 13, an 8*8 block inverse DCT 42 for performing the inverse DCT to the sum signal (an approximate signal of the video signal of 8*8 block DCT 12) between the video signal of 8*8 block inverse quantizer 41 and the video signal of block inverse compensator 33', a first adder 43 for summing the video signal of 8*8 block inverse DCT 42 and the video signal (zero) of motion compensator 53, and a first frame memory 44 for storing the frame signal passing through the first adder 43 for the purpose of interframe coding. Because the video signal of motion compensator 53 is concerned only during interframe coding, it becomes zero during intraframe coding, and during interframe coding, is a video signal of 8*8 blocks having a predetermined value.

The configuration of interframe coding in the present invention is added to the aforementioned construction of intraframe coding. The interframe coding configuration includes a 16*16 block divider 51 for dividing a video signal Sin into 16*16 blocks, a motion vector estimation portion 52 for detecting a motion vector MV from the video signal divided into 16*16 blocks and the video signal of the frame memory, a motion compensator 53 for producing a new frame, using the motion vector MV of motion vector estimation portion 52 and the frame of frame memory 44, and an optimal weight generator 70 for scaling motion vector MV output from motion vector estimation portion 52 into plurality (MV'=MV*W) according to multiple weights W within a predetermined range, and producing an optimal weight having the best among SNRs based upon a sampled frame and the plural 4*4 block frame produced according to the scaled motion vector MV'. Additionally, there is a multiplexer 60 for selectively outputting high-resolution video signal (8*8 block video signal) S14 of 8*8 block variable length coding portion 14, low-resolution video signal S24 (4*4 block video signal) of 4*4 block variable length coding portion 24, motion vector MV of motion vector estimation portion 52, and optimal weight W of optimal weight generator 70 in a predetermined order.

Figure 5:
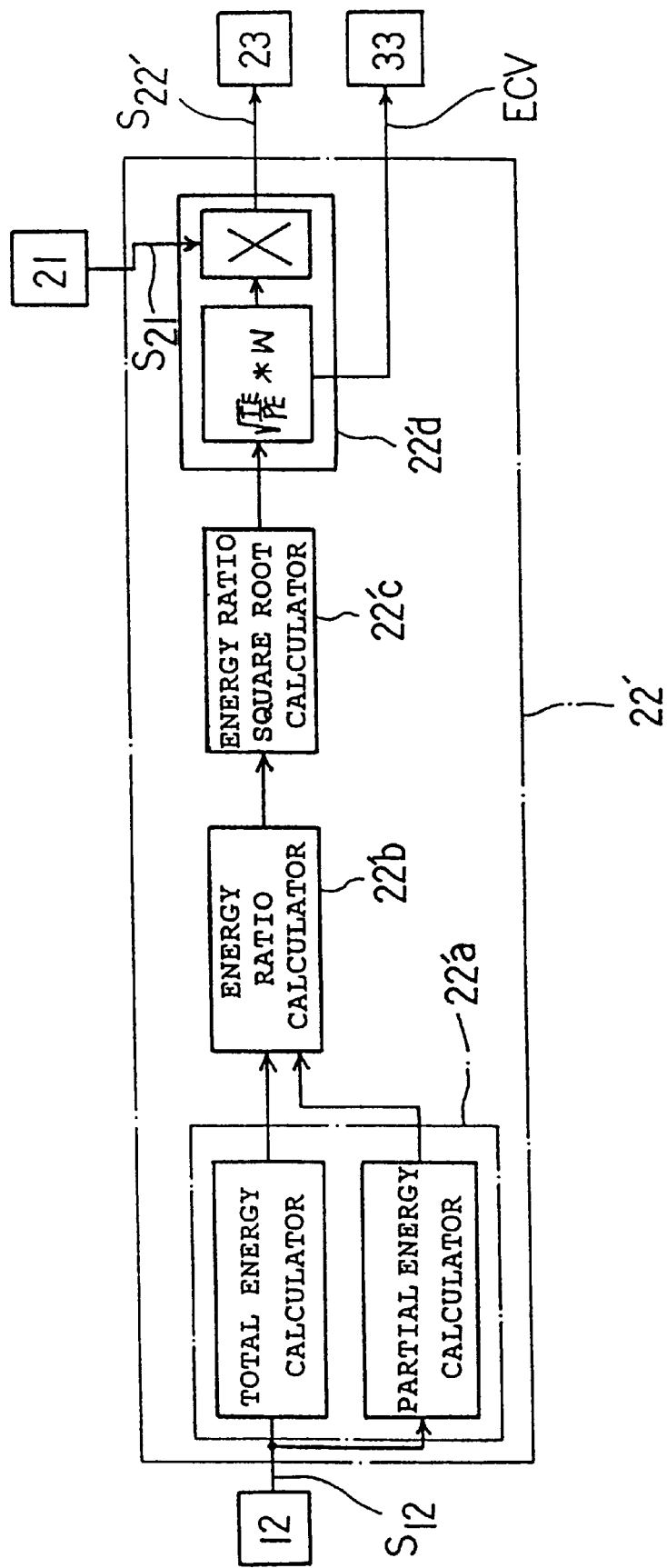
FIG. 5 is an internal block diagram of the energy coefficient compensator of FIG. 4.

Referring to FIG. 5, the conventional energy coefficient compensator 22 is changed to energy coefficient compensator 22'. Energy coefficient compensator 22' of the present invention includes an energy calculator 22'a for calculating total energy TE for video signal S12 from 8*8 block DCT 12 and partial energy PE for the video signal of the top left 4*4 blocks in 8*8 blocks, an energy ratio calculator 22'b for calculating the ratio TE/PE of total energy TE to partial energy PE obtained in energy calculator 22'b, a square root calculator 22'c for putting a square root to energy ratio TE/PE obtained from energy ratio calculator 22'b, and a multiplier 22'd for multiplying weight W to the square root of the energy ratio to obtain final energy compensation value ECV which is then provided to block inverse compensator 33', also multiplying energy compensation value ECV to signal S21 (DCT coefficient) from 4*4 block decimator 21 in order to compensate for its energy, and providing the energy compensated video signal S22' to 4*4 block quantizer 23. The DCT coefficient is obtained when DCT is performed.

Figure 7:
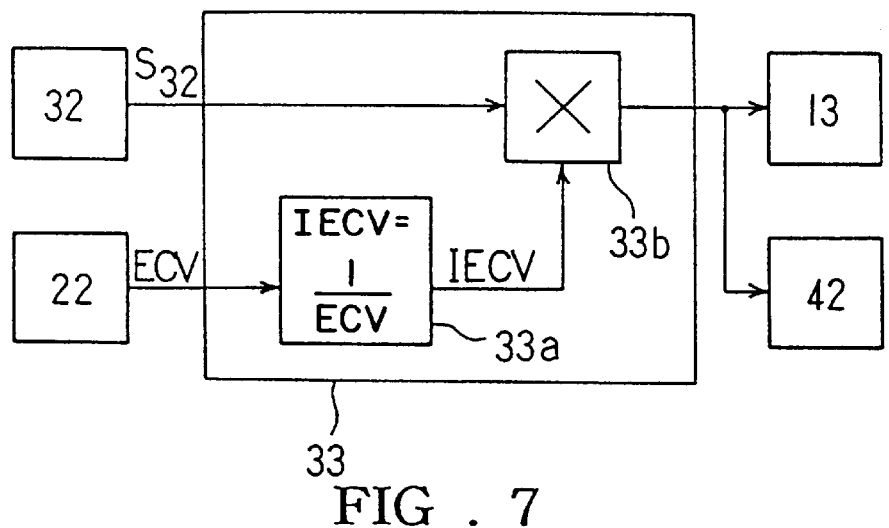
FIG. 7 is an internal block diagram of the block inverse compensator of FIG. 4.

Referring to FIG. 7, the conventional block inverse compensator 33 is changed to block inverse compensator 33'. Block inverse compensator 33' of the present invention includes energy inverse compensation value calculator 33'a for calculating energy inverse compensation value IECV (=1/ECV) with the inverse number of energy compensation value ECV from energy coefficient compensator 22', a multiplier 33'b for multiplying energy inverse compensation value IECV to signal S32 (DCT coefficient) from 8*8 block interpolator 32 to perform energy inverse compensation, and providing the energy compensated video signal to 8*8 block quantizer 13.

Figure 9:
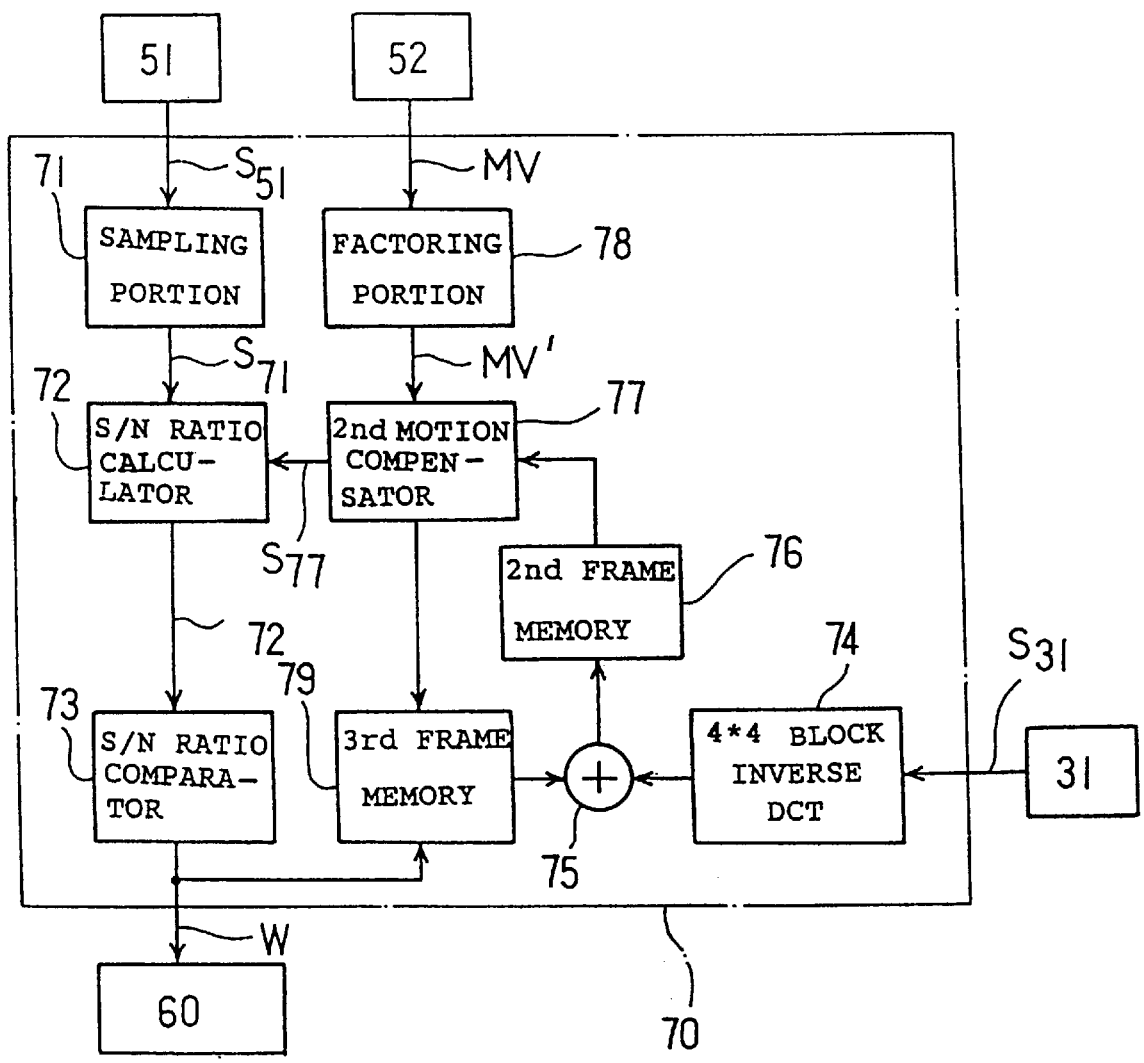
FIG. 9 is an internal block diagram of the optimal weight generator 70 of FIG. 4.

Referring to FIG. 9, optimal weight generator 70 of the present invention includes a 4*4 block inverse DCT 74 for performing inverse DCT to video signal S31 from 4*4 block inverse quantizer 31, a second frame memory 76 for summing and storing the video signal of 4*4 block inverse DCT 74 and the video signal of third frame memory 79, a factoring portion 78 for scaling motion vector MV from motion vector estimation portion 52 into plurality MV' according to multiple weights W within a predetermined range, a second motion compensator 77 for compensating for the video signal of second frame memory 76 according to the respective motion vectors MV' scaled in factoring portion 78 in order to produce multiple predicted images and offer them to third frame memory 79 and S/N ratio calculator 72, a sampling portion 71 for sampling video signal S51 of 16*16 blocks from 16*16 block divider 51 into 8*8 blocks of video signal, an S/N ratio calculator 72 for calculating S/N ratio, using the sampled video signal and the produced video signal, an S/N ratio comparator 73 for producing an optimal weight corresponding to the largest among the calculated S/N ratios, and a third frame memory 79 for storing the video signal from second motion compensator 77, and offering a frame image corresponding to the optimal weight W from S/N ratio comparator 73 to adder 75.

Figure 6:
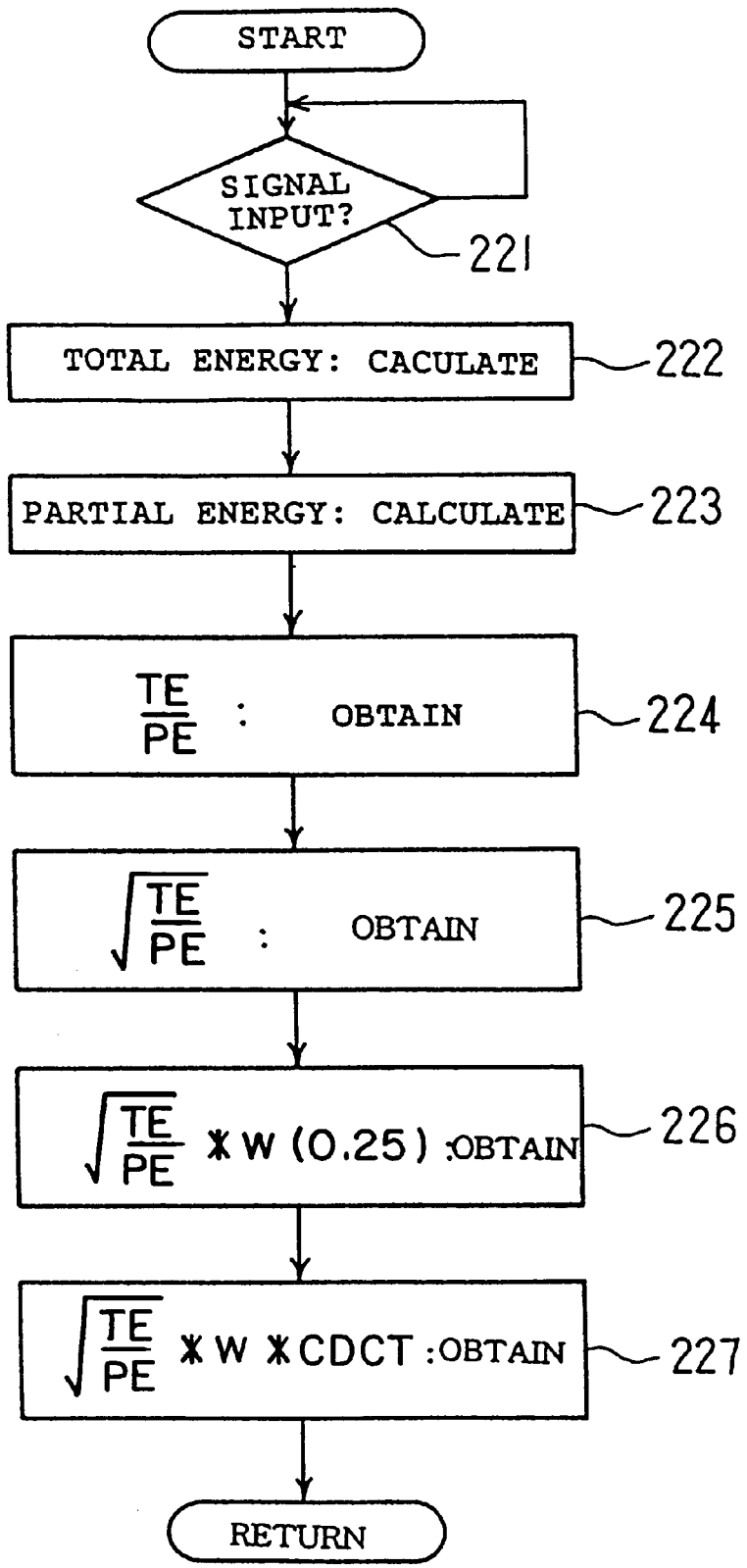
FIG. 6 is a flowchart of showing energy compensation in the energy coefficient compensator of FIG. 5.
Figure 8:
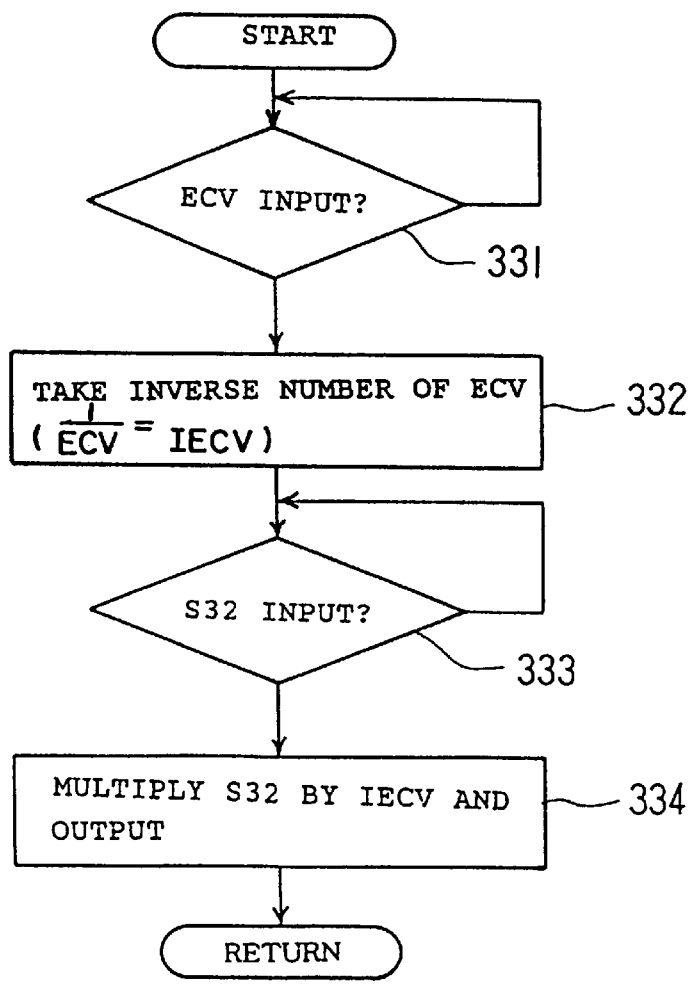
FIG. 8 is a flowchart of showing the energy inverse compensation of block inverse compensator of FIG. 7.
Figure 10:
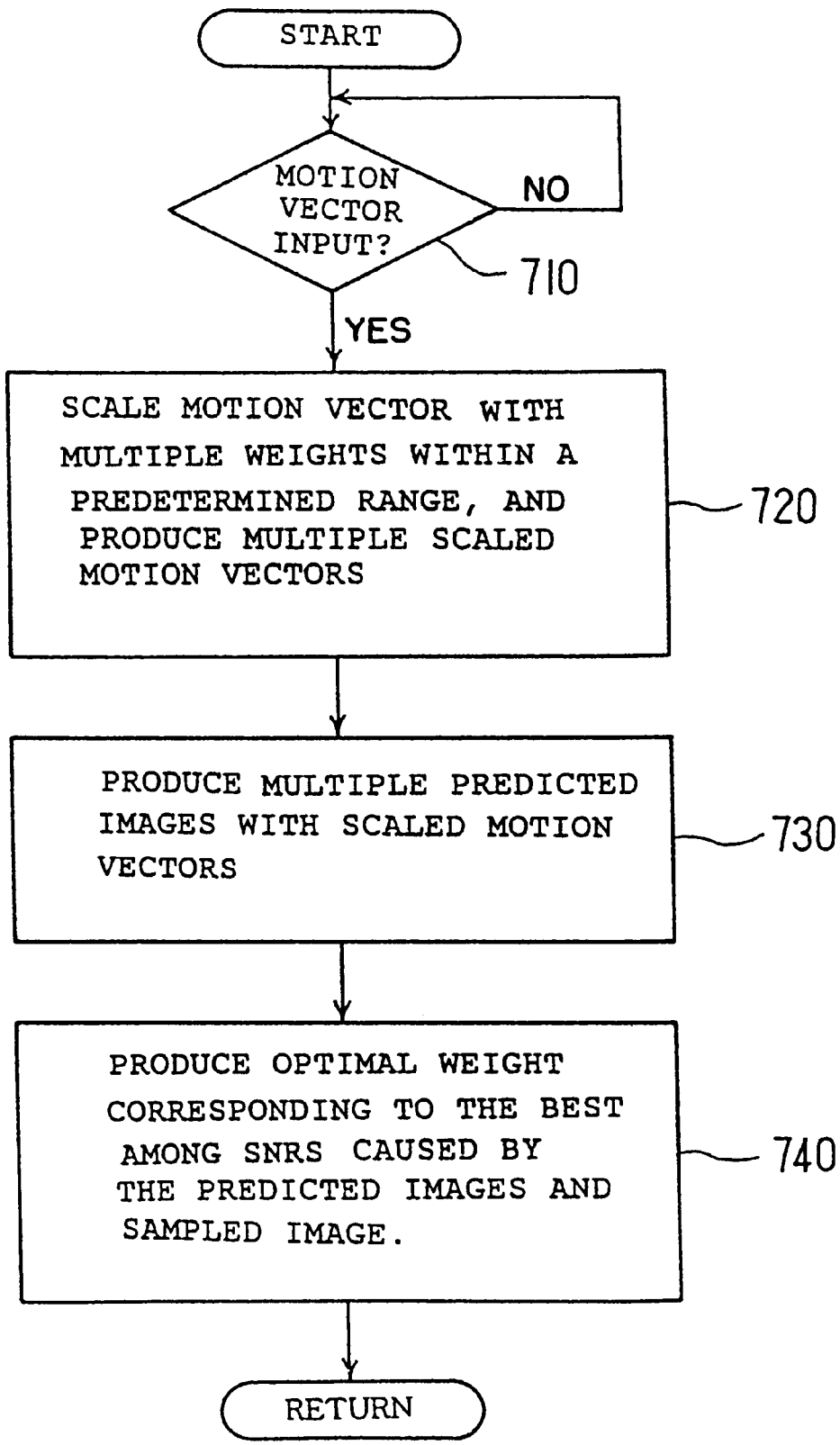
FIG. 10 is a flowchart of showing an optimal weight generation in the optimal weight generator of FIG. 9.

FIG. 6 is a flowchart of showing energy compensation in energy coefficient compensator 22' of FIG. 5. FIG. 8 is a flowchart of showing energy inverse compensation in block inverse compensator 33' of FIG. 7. FIG. 10 is a flowchart of showing optimal weight generation in optimal weight generator 70 of FIG. 9.

Figure 11:
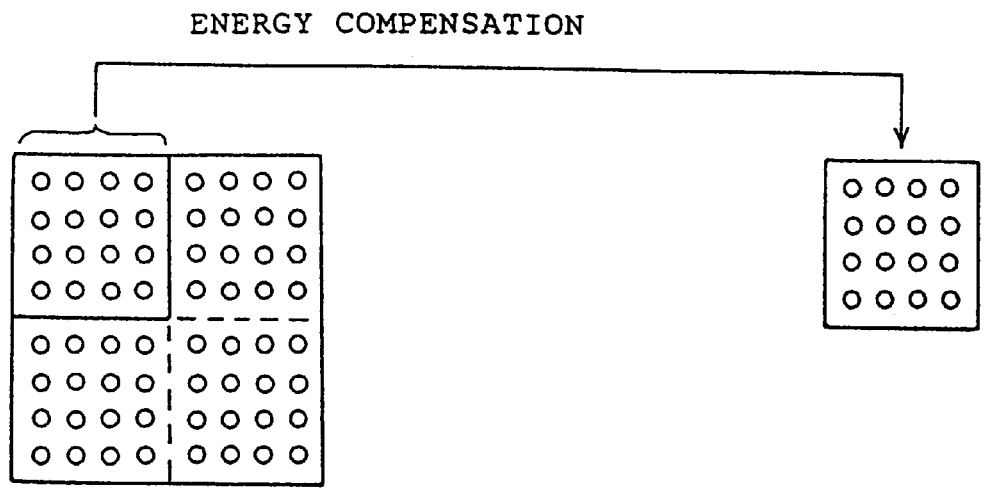
FIG. 11 is a concept diagram of explaining energy compensation according to the present invention.

FIG. 11 is a concept diagram of energy compensation according to the present invention. When 4*4 block low-resolution image is decimated from 8*8 block high-resolution image, energy compensation is inevitably required because the energy of 8*8 blocks is not suitable for the 4*4 block decimated.

Figure 12:
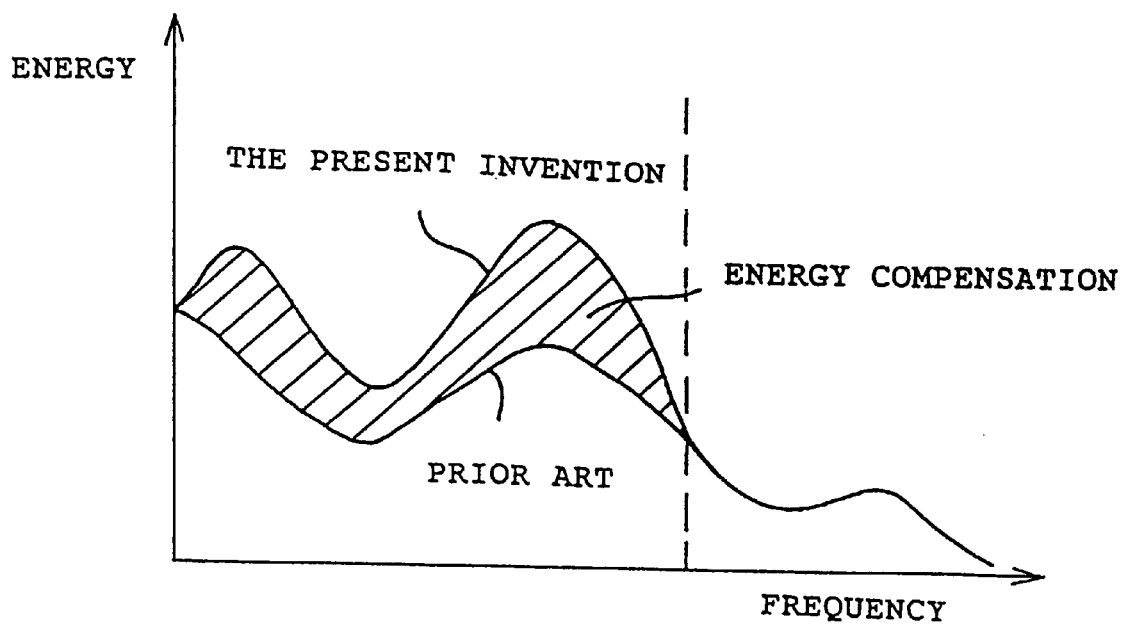
FIG. 12 is a graph for explaining the difference between the conventional energy compensation and the energy compensation of the present invention.

FIG. 12 is a frequency spectrum for explaining the difference between the energy compensation according to the present invention and that according to prior art.

The operation of the encoder of the present invention will be described below in detail with reference to the attached drawings.

First of all, referring to FIG. 4, the scalable encoder of the present invention processes video signal Sin in units of frame. This frame video signal is divided into 8*8 blocks in 8*8 block divider 11. 8*8 block DCT 12 converts the plane domain of the video signal into frequency domain through DCT. The converted signal is offered to 8*8 block quantizer 13 and 4*4 block decimator 21. In 8*8 block quantizer 14 the frequency domain of video signal is quantized, and then in 8*8 block variable length coding portion 14 it is encoded. The encoded signal S14 is output to multiplexer 60.

The 4*4 block decimator 21 decimates the 4*4 block video signal from the 8*8 block video signal output from 8*8 block DCT 12 in order to produce a low-resolution frame image from a high-resolution frame image. In this embodiment, the top left 4*4 block is extracted from 8*8 blocks, as shown in FIG. 11.

For the decimated 4*4 block video signal, energy coefficient compensator 22' performs energy compensation. This is because the energy of 8*8 blocks is not suitable for the decimated 4*4 blocks. Through this procedure, the energy of the video signal extracted from high-resolution image becomes fitted to a low-resolution image.

Specifically explaining the energy compensation performed in energy coefficient compensator 22' of the present invention referring to FIG. 5, in energy calculator 22'a of energy coefficient compensator 22', the total energy TE of the video signal from 8*8 block DCT 12 and the partial energy PE of the video signal of the top left 4*4 blocks in the 8*8 blocks are calculated. The total energy TE is obtained according to equation 1, and partial energy PE according to equation 2.

$$TE = \sum_{i=0}^{63} (Ci)^2 (8 \times 8 \text{ blocks}) \qquad \text{[Equation 1]}$$

$$PE = \sum_{i=0}^{15} (Ci)^2 (4 \times 4 \text{ blocks}) \qquad \text{[Equation 2]}$$

Here, Ci is a DCT coefficient (CDCT) produced after the DCT of 8*8 block and 4*4 block frame images.

In energy ratio calculator 22'b, the ratio TE/PE of total energy TE to partial energy PE obtained in energy calculator 22'a is calculated and offered to square root calculator 22'c.

In square root calculator 22'c a square root is taken to energy ratio TE/PE obtained in energy ratio calculator 22', which is then provided to multiplier 22'd. In multiplier 22'd, the square root of the energy ratio is multiplied by weight W, that is, 0.25, in order to find final energy compensation value ECV. This energy compensation value is given to block inverse compensator 33', and is expressed in equation 3. Multiplier 22'd multiplies energy compensation value ECV by the signal (DCT coefficient) from 4*4 block decimator 21 for the purpose of energy compensation. The energy-compensated video signal is offered to 4*4 block quantizer 23.

$$ECV = \sqrt{\frac{TE}{PE}} * 0.25(W) \qquad \text{[Equation 3]}$$

The explanation referring to FIG. 5 is a case where energy coefficient compensator 22' is formed with hardware. However, the energy coefficient compensator 22' may be made with software. The description of energy coefficient compensator formed with software corresponds to steps 221 to 227 in FIG. 6, and it is equal to that of energy coefficient compensator 22' made with hardware.

Meanwhile, the energy compensation considering the energy of 8*8 block frame in energy coefficient compensator 22' of the present invention is performed only for AC component in the frequency domain. DC components indicate average luminance for the 4*4 block frame. This average luminance does not change even after the decimation of 4*4 blocks from 8*8 blocks. The energy compensation for the DC components is performed by multiplying the DCT coefficient of 4*4 blocks by the weight 0.25 without any scaling.

The above procedure includes, with respect to the first input frame image, a step of encoding high-resolution image and a step of decimating and encoding a low-resolution image from the high-resolution image. Next, the intraframe coding and interframe coding are explained.

First of all, in intraframe coding, the video signal of 4*4 block quantizer 23 is inversely quantized in 4*4 block inverse quantizer 31, and zero is interpolated to the rest blocks excluding the 4*4 blocks in 8*8 block interpolator 32 in order to produce 8*8 blocks of video signal. The energy of the 8*8 block video signal is inversely compensated for in block inverse compensator 33' to be suitable for high-resolution image (8*8 block image) because it was compensated for to be suitable for low resolution in energy coefficient compensator 22'. The inverse energy compensation in energy coefficient compensator 22' will be explained below.

Referring to FIG. 7, in energy inverse compensation value calculator 33'a of block inverse compensator 33', energy inverse compensation value IECV (=1/ECV) is calculated with the inverse number of the energy compensation value ECV from energy coefficient compensator 22', and then offered to multiplier 33'b. Multiplier 33'b multiplies energy inverse compensation value IECV by the signal (DCT coefficient) from 8*8 block interpolator 32 for the purpose of inverse energy compensation. The inversely energy compensated video signal is offered to both of 8*8 block quantizer 13 and 8*8 block inverse DCT 42.

The explanation referring to FIG. 7 is a case where block inverse compensator 33' is formed with hardware. However, the compensator 33' may be made with software. The description of block inverse compensator formed with software corresponds to steps 331 to 334 in FIG. 8, and it is equal to that of compensator 33' made with hardware.

The 8*8 block quantizer 13 quantizes and outputs the difference signal where the video signal from block inverse compensator 33' is subtracted from the second input video signal. Here, when the video signal from block inverse compensator 33' is subtracted from the second input frame video signal, the overlapped video signal corresponding to the 4*4 blocks decimated in 4*4 block decimator 21 is removed from the 8*8 block frame, performing intraframe coding.

A preparation prior to interframe coding is now explained. The 8*8 block video signal (video signal without 4*4 block signal value) quantized in 8*8 block quantizer 13 is inversely quantized and output to 8*8 block inverse DCT 42. The 8*8 block inverse DCT 42 sums the 8*8 block video signal from 8*8 block quantizer 13 and the 8*8 block video signal (video signal where signal value exists only in 4*4 blocks) from block inverse compensator 33', and then converts the frequency domain into plane domain through inverse DCT. The 8*8 block video signal converted into plane domain is stored after passing through adder 43. This is the completion of preparation for interframe coding.

In interframe coding, the video signal input to the scalable encoder of the present invention is divided into 16*16 blocks in 16*16 block divider 51, and then offered to both of motion vector estimation portion 52 and optimal weight generator 70. The motion vector estimation portion 52 detects motion vector MV from the video signal divided into 16*16 blocks and the video signal from frame memory 44, and the motion vector is provided to first motion compensator 53, multiplexer 60, and optimal weight generator 70. First motion compensator 53 compensates for the video signal of first frame memory 44 using the motion vector so that a new frame video signal is sent to 8*8 block DCT 12 and adder 43. The 8*8 block DCT 12 subtracts the new frame video signal from the video signal from 8*8 block divider 11. The different signal where only the signal component corresponding to the contour remains is converted into frequency domain through DCT. The further procedure is the same as that of high-resolution encoding, and thus will be omitted.

As in above, there have been sequentially described encoding of high-resolution video signal, encoding of low-resolution video signal, intraframe coding, and interframe coding. From now, the specific operation of optimal weight generator 70 for producing an optimal weight for optimal motion vector MV by scaling it will be explained.

Referring to FIG. 9, in 4*4 block inverse DCT 74 of optimal weight generator 70, the video signal of 4*4 blocks from 4*4 block inverse quantizer 31 is converted into plane domain through inverse DCT, and then output to second frame memory 76 through second adder 75 so that the video signal is stored in second frame memory 76.

Meanwhile, in factoring portion 78 of optimal weight generator 70, the motion vector MV from motion vector estimation portion 52 is scaled according to multiple weights within a predetermined range. For instance, the range of weight is set to be from 0.1 to 0.8, and the interval between weights be 0.1, weights W become 0.1, 0.2, 0.3, 0.4, 0.5, 0.6, 0.7, and 0.8. If the motion vector is scaled with the multiple weights, the scaled motion vectors become 0.1*MV, 0.2*MV, 0.3*MV, . . . , 0.8*MV, which are sent to second motion compensator 77. In this embodiment, for clear understanding, the range of weight is set from 0.3 to 0.6, and their interval 0.1. Therefore, the motion vectors MV' are scaled as 0.3*MV, 0.4*MV, 0.5*MV, 0.6*MV, which are then sent to second motion compensator 77.

Here, second motion compensator 77 predicts multiple new frame images by applying scaled motion vectors MV' (=0.3*MV, 0.4*MV, 0.5*MV, 0.6*MV) given from factoring portion 78 respectively to the video signals stored in frame memory 76, and the predicted frame images are stored in frame memory 79.

The predicted frame images are designed to enable the decoder to perform an optimal decoding procedure when an image to be obtained during decoding in the decoder is previously produced, then an optimal weight having the best among SNRs based upon the previously predicted image and the present image is produced, and finally the optimal weight is sent to the decoder.

In sampling portion 71 of optimal weight generator 70, the video signal of 16*16 blocks from 16*16 block divider 51 is sampled into 8*8 blocks, which are then sent to S/N ratio calculator 72. In S/N ratio calculator 72, the S/N ratio of each of the 8*8 block video signal from sampling portion 71 and the video signal from second motion compensator 77 is calculated, and the result is sent to S/N ratio comparator 73. Then, S/N ratio comparator 73 compares the S/N ratio values provided, and sends the optimal weight corresponding to the largest to multiplexer 60 and third frame memory 79. The third frame memory 79 outputs a frame video signal corresponding to the optimal weight from S/N ratio comparator 73 to adder 75. The adder 75 sums the video signal from frame memory 79 and the video signal through 4*4 block inverse DCT 74, and sends the result to frame memory 76.

The explanation referring to FIG. 9 is a case where optimal weight generator 70 is formed with hardware. However, the generator may be made with software. The description of the generator formed with software corresponds to steps 710 to 740 in FIG. 10, and it is equal to that of generator 70 made with hardware.

Finally, multiplexer 60 outputs encoding signal S14 from 8*8 block variable length coding portion 14, encoding signal S24 from 4*4 block variable length coding portion 24, motion vector MV from motion vector estimation portion 52, and optimal weight W from optimal weight generator 70 in a sequential order.

As described above, the energy compensation of the present invention in decimation of low-resolution image from high-resolution image is performed with optimal energy to the low-resolution image by considering the rate between the total energy TE of the high-resolution and partial energy PE of a corresponding block to be decimated. However, in the prior art, energy compensation is very simple by multiplying the DCT coefficient by weight W, 0.25. Even in the scaling of motion vector, the prior art scales it with a fixed value 0.5. In this invention, the optimal weight is produced so that an image to be decoded has the best S/N ratio, and is thus applied to the motion vector scaling. The energy compensation and motion vector scale of the present invention eliminate the drift effect where the quality of picture decreases so that a good video recovery is enabled in decoding.

Figure 2A:
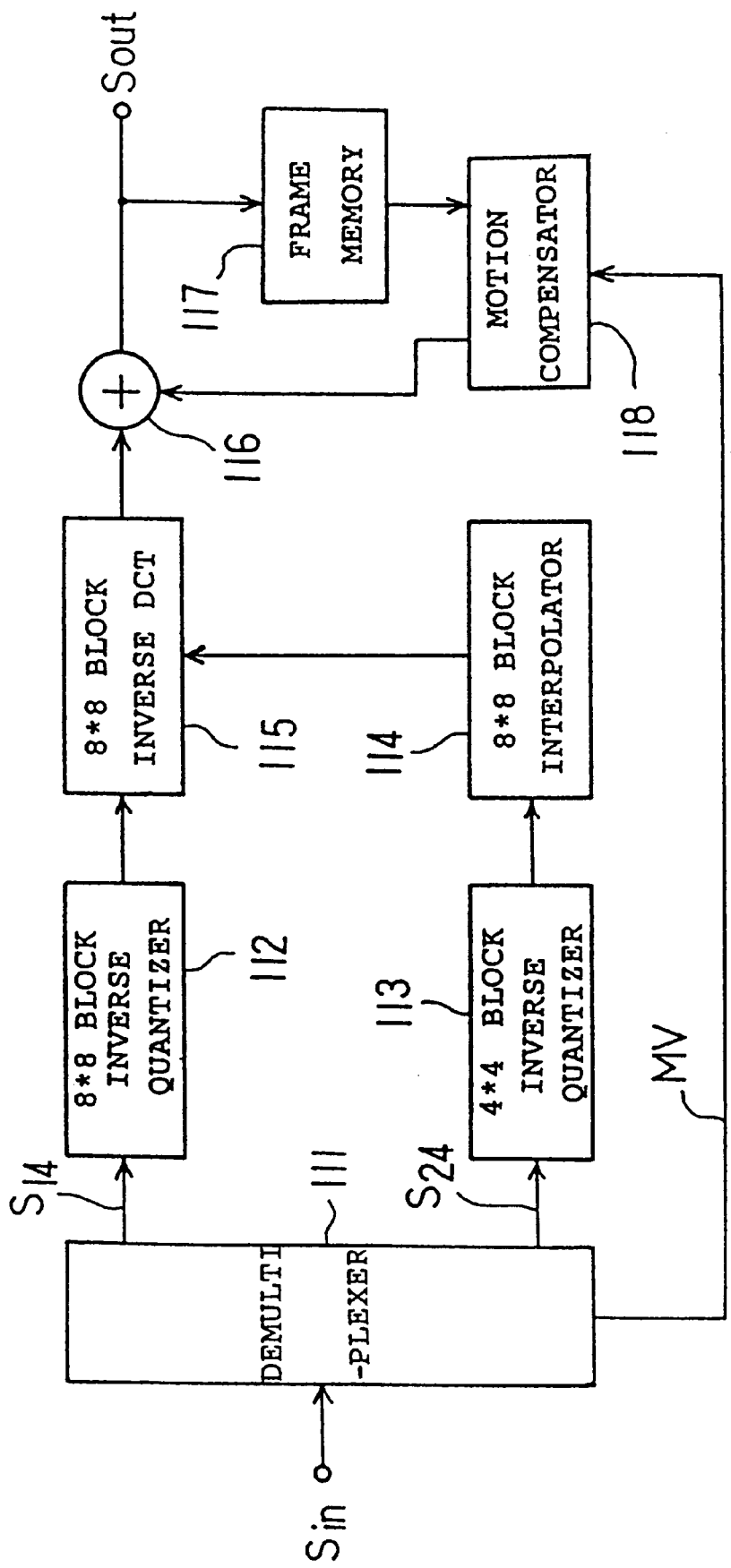
FIG. 2a is a block diagram of a conventional high-resolution decoder, FIG. 2b being a low-resolution decoder.
Figure 2B:
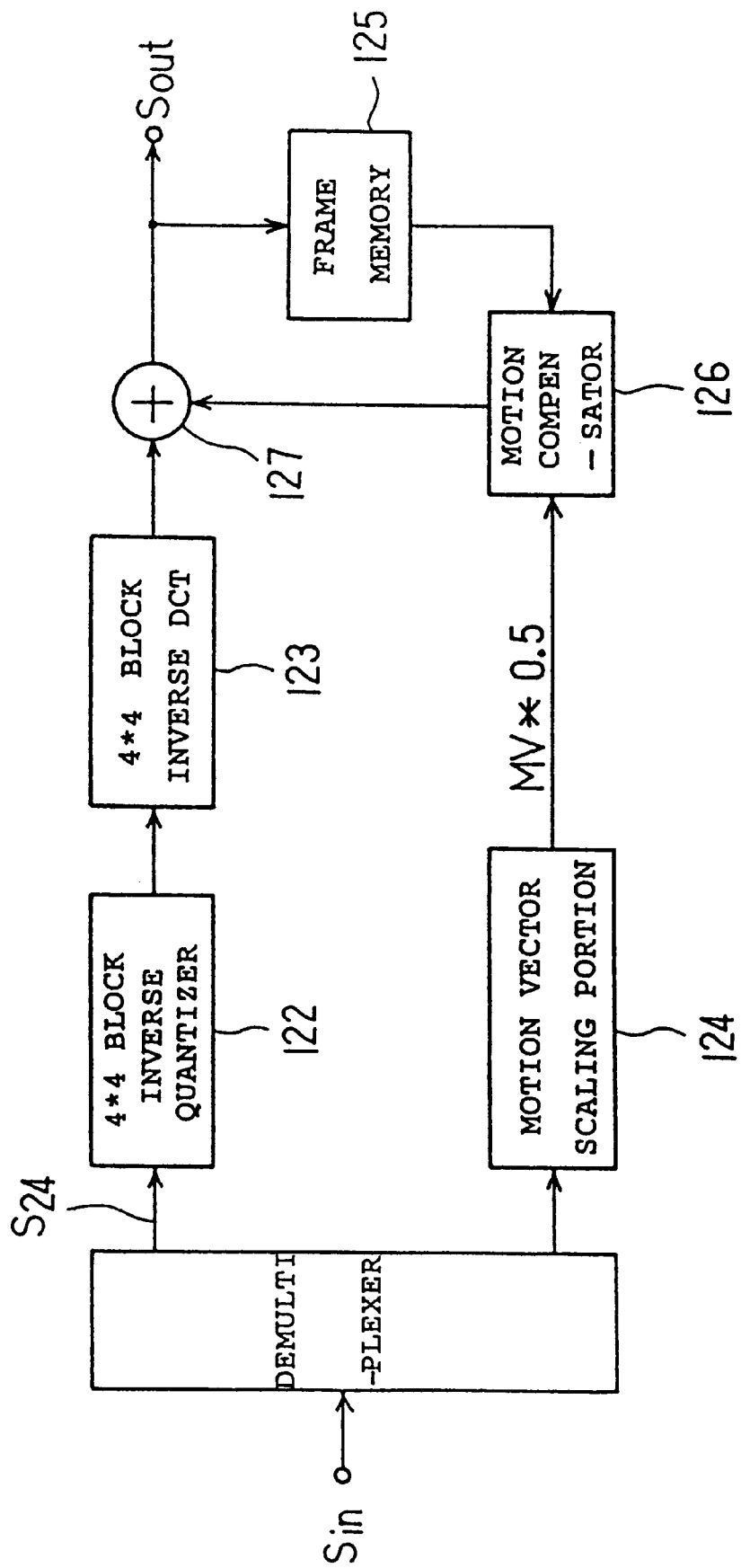
Figure 3:
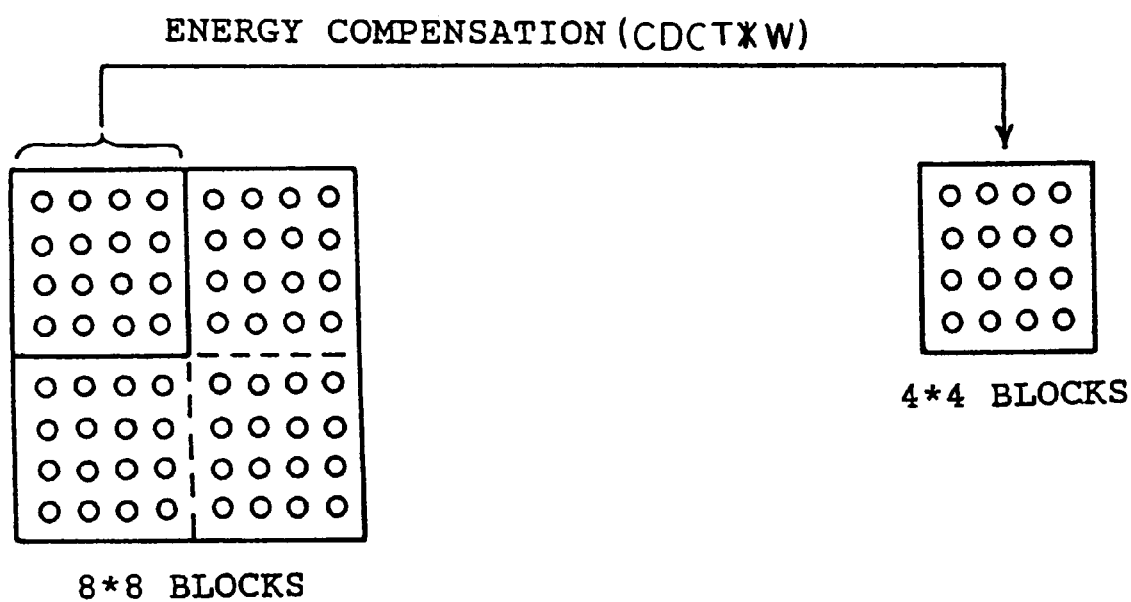
FIG. 3 is a concept diagram for explaining energy compensation according to prior art.

For the brief explanation of the scalable encoder, first of all, the operation of high-resolution decoding is the same as that referring to FIG. 2a. The low-resolution decoding operation is almost the same as that referring to FIG. 2b. The difference is that instead of fixed weight 0.5 for motion vector scaling, the present invention applies an optimal weight that ensures best quality of picture.

In conclusion, the present invention accurately performs the decimation of low-resolution frame from high-resolution frame according to an improved energy compensation technique, thereby eliminating the drift effect on the image and enabling good video recovery.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A scalable encoder for compensating for the energy of a low resolution image decimated from a high resolution image by frames, and inversely compensating for the energy of a video signal that is interpolated to the high resolution image from the low resolution image, the encoder comprising:

an 8*8 block DCT for dividing a video signal input by frames into 8*8 blocks, and performing DCT to the video signal divided;

an 8*8 block quantizer for quantizing a difference signal between the DCT transformed video signal and the interpolated video signal;

a 4*4 block decimator for decimating 4*4 blocks of video signal from the video signal DCT transformed;

a 4*4 block quantizer for quantizing the video signal decimated;

an 8*8 block interpolator for interpolating the energy-compensated video signal into 8*8 blocks;

an energy compensator for obtaining an energy compensation value on basis of energy distributions of the video signal from the 8*8 block DCT and the 4*4 block video signal at the upper side of the 8*8 block to compensate the energy of the 4*4 block video signal from the 4*4 block decimator; and an energy inverse compensator for inversely compensating for the energy of the image from the 8*8 block interpolator according to the energy compensation value from the energy compensator; and wherein the energy compensator comprises:
an energy calculator for calculating a total energy of the video signal from the 8*8 block DCT and a partial energy of 4*4 block video signal at the left upper side of the 8*8 blocks;
an energy ratio calculator for calculating the ratio of the total energy to the partial energy obtained from the energy calculator;
a square root calculator for taking a square root to the energy ratio obtained from the energy ratio calculator; and
a multiplier for multiplying the square root of the energy ratio by a weight to obtain an energy compensation value, providing respectively the energy compensation value and the weight to the energy inverse compensator for an AC component and a DC component of the signal from the 4*4 block decimator, multiplying the signal from the 4*4 block decimator by the energy compensation value and the weight for the purpose of energy compensation, and providing an energy compensated video signal to the 4*4 block quantizer.

2. The encoder as claimed in claim 1 wherein the energy calculator obtains the total energy with $$\sum_{i=0}^{63}(C_i)^2(8\times 8 \text{ blocks}),$$

and the partial energy with $$\sum_{i=0}^{15}(C_i)^2(4\times 4 \text{ blocks}),$$

where $C_i$ is a discrete cosine transformation coefficient.

3. A scalable encoder for compensating for the energy of a low resolution image decimated from a high resolution image by frames, and inversely compensating for the energy of a video signal that is interpolated to the high resolution image from the low resolution image, the encoder comprising:

an 8*8 block DCT for dividing a video signal input by frames into 8*8 blocks, and performing DCT to the video signal divided;

an 8*8 block quantizer for quantizing a difference signal between the DCT transformed video signal and the interpolated video signal;

a 4*4 block decimator for decimating 4*4 blocks of video signal from the video signal DCT transformed;

a 4*4 block quantizer for quantizing the video signal decimated;

an 8*8 block interpolator for interpolating the energy-compensated video signal into 8*8 blocks;

an energy compensator for obtaining an energy compensation value on basis of energy distributions of the video signal from the 8*8 block DCT and the 4*4 block video signal at the upper side of the 8*8 block to compensate the energy of the 4*4 block video signal from the 4*4 block decimator; and an energy inverse compensator for inversely compensating for the energy of the image from the 8*8 block interpolator according to the energy compensation value from the energy compensator; and wherein the energy inverse compensator comprises:
an energy inverse compensation value calculator for calculating an energy inverse compensation value with the inverse number of the energy compensation value from the energy compensator; and
a multiplier for multiplying the signal from the 8*8 block interpolator by the energy inverse compensation value and the inversed weight for the purpose of inverse energy compensation, and providing the energy compensated video signal to the 8*8 block quantizer.

4. A scalable encoding method including a 8*8 block encoding mode and a 4*4 block encoding mode, the 8*8 block encoding mode being achieved by discrete cosine transforming and quantizing the 8*8 block signal divided from an image signal, the 4*4 block encoding mode being achieved by quantizing a 4*4 block signal decimated from a 8*8 block signal and inversely quantizing the 4*4 block signal, the method comprising the steps of:

(a) obtaining an energy compensation value on basis of energy distributions of the transformed 8*8 block video signal and the decimated 4*4 block video signal to compensate the energy of the decimated 4*4 block video signal; and (b) inversely compensating for the energy of the interpolated video signal according to the energy compensation value; and wherein the step (a) includes the substeps of:
  (c) calculating a total energy corresponding to the transformed 8*8 blocks video signal and a partial energy corresponding to the decimated 4*4 block video signal;
  (d) calculating the ratio of the total energy to the partial energy from the step (c);
  (e) taking a square root to the energy ratio from the step (d); and
  (f) multiplying the square root by a weight to obtain the energy compensation value, the energy compensation value and the weight being respectively multiplied by the decimated 4*4 block video signal to compensate energy of an AC component and a DC component of the decimated 4*4 block video signal.

5. The encoder as claimed in claim 4 wherein the step (c) obtains the total energy with $$\sum_{i=0}^{63}(C_i)^2 (8 \times 8 \text{ blocks}),$$

and the partial energy with $$\sum_{i=0}^{15}(C_i)^2 (4 \times 4 \text{ blocks}),$$

where $C_i$ is a discrete cosine transformation coefficient.

6. A scalable encoding method including a 8*8 block encoding mode and a 4*4 block encoding mode, the 8*8 block encoding mode being achieved by discrete cosine transforming and quantizing the 8*8 block signal divided from an image signal, the 4*4 block encoding mode being achieved by quantizing a 4*4 block signal decimated from a 8*8 block signal and inversely quantizing the 4*4 block signal, the method comprising the steps of:
  (a) obtaining an energy compensation value on basis of energy distributions of the transformed 8*8 block video signal and the decimated 4*4 block video signal to compensate the energy of the decimated 4*4 block video signal; and
  (b) inversely compensating for the energy of the interpolated video signal according to the energy compensation value; and
  wherein the step (b) comprises the substeps of:
  (g) calculating an energy inverse compensation value with the inverse number of the energy compensation value; and
  (h) multiplying the interpolated 8*8 block video signal by the energy inverse compensation value and the inversed weight in order to perform the inverse compensation of energy.

7. A scalable encoder having a n*n block coding system for discretely cosine transforming and quantizing a n*n block signal divided from an image signal to compress the n*n block signal and a m*m block coding system for quantizing m*m block signal decimated from the n*n block signal to compress the m*m block and quantizing inversely the m*m block signal to interpolate the m*m block signal to n*n block signal, where m is smaller than n, the encoder comprising:
  an energy compensator for obtaining an energy compensation value on basis of energy distributions of the discrete cosine transformed n*n block signal and the m*m block signal at the left upper side of the n*n blocks to compensate the energy of the decimated m*m block signal; and
  an energy inverse compensator for compensating inversely the energy of the interpolated n*n block signal according to the energy compensation value; and
  wherein the energy compensator comprises:
    an energy calculator for calculating a total energy of the discrete cosine transformed n*n block signal and a partial energy of the m*m block signal;
    an energy ratio calculator for calculating the ratio of the total energy to the partial energy;
    a square root calculator for taking a square root to the energy ratio; and
    a multiplier for multiplying the square root of the energy ratio by a weight to obtain an energy compensation value, the energy compensation value and the weight being multiplied by the decimated m*m block signal to compensate respectively the energy of an AC component and a DC component of the m*m block signal, the energy compensation value and the weight being supplied to the energy inverse compensator.

8. The encoder as claimed in claim 7 wherein m is n/2.

9. The encoder as claimed in claim 7 wherein the energy calculator obtains the total energy with $$\sum_{i=0}^{n^2-1}(C_i)^2 (n*n \text{ blocks}),$$

and the partial energy with $$\sum_{i=0}^{m^2-1}(C_i)^2 (m*m \text{ blocks}),$$

where $C_i$ is a discrete cosine transformation coefficient.

10. A scalable encoder having a n*n block coding system for discretely cosine transforming and quantizing a n*n block signal divided from an image signal to compress the n*n block signal and a m*m block coding system for quantizing m*m block signal decimated from the n*n block signal to compress the m*m block and quantizing inversely the m*m block signal to interpolate the m*m block signal to n*n block signal, where m is smaller than n, the encoder comprising:
  an energy compensator for obtaining an energy compensation value on basis of energy distributions of the discrete cosine transformed n*n block signal and the m*m block signal at the left upper side of the n*n blocks to compensate the energy of the decimated m*m block signal; and
  an energy inverse compensator for compensating inversely the energy of the interpolated n*n block signal according to the energy compensation value; and
  wherein the energy inverse compensator comprises:
    an energy inverse compensation value calculator for calculating an energy inverse compensation value with the inverse number of the energy compensation value from the energy compensator; and
    a multiplier for multiplying the interpolated n*n block signal by the energy inverse compensation value to compensate inversely the energy and obtain inversely decimated image signal.

11. A coding system comprising:
  a discrete cosine transformation unit for transforming signal divided as a n*n block signal;

a decimation unit for decimating a m*m block signal from the n*n block signal, where m is smaller than n; and an energy compensation unit for obtaining an energy compensation value on basis of energy distributions of the transformed n*n block signal and the decimated m*m block signal to compensate the energy of the decimated m*m block signal; and wherein the energy compensation unit includes:

a first calculating unit for calculating total energy of the transformed n*n block signal and partial energy of the decimated m*m block signal;

a second calculating unit for calculating square root of the ratio of the total energy to the partial energy; and multiplying unit for multiplying the square root of the energy ratio by a weight to obtain an energy compensation value, the energy compensation value and the weight being multiplied by the decimated m*m block signal to compensate respectively the energy of an AC component and a DC component of the m*m block signal.

12. A coding system comprising:

a discrete cosine transformation unit for transforming signal divided as a n*n block signal;

a decimation unit for decimating a m*m block signal from the n*n block signal, where m is smaller than n;

an energy compensation unit for obtaining an energy compensation value on basis of energy distributions of the transformed n*n block signal and the decimated m*m block signal to compensate the energy of the decimated m*m block signal;

an interpolating unit for interpolating the energy compensated m*m block signal into the n*n block signal; and an energy inversely compensating unit for compensating inversely the energy of the interpolated n*n block signal according to the energy compensation value; and wherein the energy inversely compensating unit includes:

a calculating unit for calculating an energy inverse compensation value with the inverse number of the energy compensation value; and a multiplying unit for multiplying the interpolated n*n block signal by the energy inverse compensation value and the inversed weight to compensate inversely the energy.

13. A scalable encoding method comprising the steps of:

(a) discrete cosine transforming a n*n block signal divided from an image signal;

(b) decimating m*m block signal from the transformed n*n block signal, where m is smaller than n;

(c) quantizing the decimated m*m block signal;

(d) obtaining an energy compensation value on basis of the energy distributions of the transformed n*n block signal and the decimated m*m block signal to compensate the energy of the m*m block signal;

(e) interpolating the energy compensated m*m block signal into the n*n block signal;

(f) compensating inversely the energy of the interpolated n*n block signal according to the energy compensation value; and (g) quantizing a difference signal between the transformed n*n block signal and the interpolated n*n block signal; and wherein the step (d) includes the steps of:

(h) calculating a total energy of the transformed n*n block signal and calculating a partial energy of the decimated m*m block signal;

(i) calculating the square root of ratio of the total energy to the partial energy; and (j) multiplying the square root by a weight to obtain the energy compensation value, the energy compensation value and the weight being multiplied by the decimated m*m block signal to compensate the energy of an AC component and a DC component of the m*m block signal.

14. A scalable encoding method comprising the steps of:

(a) discrete cosine transforming a n*n block signal divided from an image signal;

(b) decimating m*m block signal from the transformed n*n block signal, where m is smaller than n;

(c) quantizing the decimated m*m block signal;

(d) obtaining an energy compensation value on basis of the energy distributions of the transformed n*n block signal and the decimated m*m block signal to compensate the energy of the m*m block signal;

(e) interpolating the energy compensated m*m block signal into the n*n block signal;

(f) compensating inversely the energy of the interpolated n*n block signal according to the energy compensation value; and (g) quantizing a difference signal between the transformed n*n block signal and the interpolated n*n block signal; and wherein the step (f) includes the steps of:

(k) calculating an energy inverse compensation value with the inverse number of the energy compensation value; and (l) multiplying the interpolated n*n block signal by the energy inverse compensation value and the inversed weight.

15. A coding method comprising the steps of:

(a) discrete cosine transforming a n*n block signal divided from an image signal;

(b) decimating a m*m block signal from the n*n block signal, where m is smaller than n; and (c) obtaining an energy compensation value on basis of energy distributions of the transformed n*n block signal and the decimated m*m block signal to compensate the energy of the decimated m*m block signal; and wherein step (c) includes the steps of:

(d) calculating total energy of the transformed n*n block signal and partial energy of the decimated m*m block signal;

(e) calculating square root of the ratio of the total energy to the partial energy; and (f) multiplying the square root of the energy ratio by a weight to obtain an energy compensation value, the energy compensation value and the weight being multiplied by the decimated m*m block signal to compensate respectively the energy of an AC component and DC component of the m*m block signal.

16. A coding method comprising the steps of:

(a) discrete cosine transforming a n*n block signal divided from an image signal;

(b) decimating a m*m block signal from the n*n block signal, where m is smaller than n;

(c) obtaining an energy compensation value on basis of energy distributions of the transformed n*n block signal and the decimated m*m block signal to compensate the energy of the decimated m*m block signal;

(g) interpolating the energy compensated m*m block signal into the n*n block signal; and (h) compensating inversely the energy of the interpolated n*n block signal according to the energy compensation value; and wherein the step (h) includes the steps of:

(i) calculating an energy inverse compensation value with the inverse number of the energy compensation value; and (j) multiplying the interpolated n*n block signal by the energy inverse compensation value and the inversed weight to compensate inversely the energy.

* * * * *